(12) United States Patent
Choi

(10) Patent No.: US 11,674,088 B1
(45) Date of Patent: Jun. 13, 2023

(54) HYDROTHERMAL DEHALOGENATION OF CHEMICALS

(71) Applicant: Saudi Arabian Oil Company, Dhahran (SA)

(72) Inventor: Ki-Hyouk Choi, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 17/939,573

(22) Filed: Sep. 7, 2022

(51) Int. Cl.
*C10G 1/10* (2006.01)
*C10G 1/00* (2006.01)

(52) U.S. Cl.
CPC .............. *C10G 1/10* (2013.01); *C10G 1/002* (2013.01); *C10G 2300/1003* (2013.01); *C10G 2300/202* (2013.01); *C10G 2300/4012* (2013.01); *C10G 2300/4081* (2013.01); *C10G 2300/80* (2013.01)

(58) Field of Classification Search
CPC .. C10G 1/10; C10G 1/002; C10G 2300/1003; C10G 2300/202; C10G 2300/4012; C10G 2300/4081; C10G 2300/80
See application file for complete search history.

(56) References Cited

U.S. PATENT DOCUMENTS

| 5,958,987 | A | * | 9/1999 | Schwartz, Jr. | ............ C08J 11/16 528/489 |
| 10,442,997 | B2 | | 10/2019 | Narayanaswamy et al. | |
| 11,124,707 | B2 | | 9/2021 | Choi et al. | |
| 2019/0270939 | A1 | * | 9/2019 | Javeed | ................... C10G 1/002 |

FOREIGN PATENT DOCUMENTS

| CN | 104650380 A | 5/2015 |
| JP | 4467336 B2 | 5/2010 |

OTHER PUBLICATIONS

PE Europe (Final Report for "PVC Recovery Options; Environmental and Economic System Analysis", dated Apr. 10, 2003—see p. 13 of the report). (Year: 2003).*

(Continued)

*Primary Examiner* — Ali Z Fadhel
(74) *Attorney, Agent, or Firm* — Bracewell LLP; Constance G. Rhebergen; Eleanor L. Tyson

(57) ABSTRACT

A process for treating a plastic waste and a spent caustic, the process comprising the steps of mixing a feed plastic and a spent caustic stream in a feed mixer to produce a mixed feed, wherein the feed plastic comprises the plastic waste in the form of plastic waste chips; introducing the mixed feed to a hydrothermal reactor; reacting the mixed feed in the hydrothermal reactor to produce an effluent, wherein chlorine is removed from the plastic waste in the presence of the sodium hydroxide, wherein the chlorine reacts with sodium hydroxide to produce sodium chloride and water; introducing the effluent to a washing and dewatering unit, wherein the effluent comprises liquid phase materials and solid materials, wherein the solid materials comprise dechlorinated plastics; and separating the liquid phase materials and solid materials in the washing and dewatering unit to produce a dechlorinated plastic waste and a neutralized wastewater.

19 Claims, 1 Drawing Sheet

(56) References Cited

OTHER PUBLICATIONS

Czajczynska, D. et al.; "Potential of Pyrolysis processes in the waste management sector" Thermal Science and Engineering Progress 3 (2017); pp. 171-197.
House, M.W. et al.; "Review of Microbially Induced Corrosion and Comments on Needs Related to Testing Procedures" 4th International Conference on the Durability of Concrete Structures, Jul. 24-26, 2014, Perdue University, West Lafayette, IN; pp. 1-10.
Kubatova, Alena et al.; "Dechlorination of Lindane, Dieldrin, Tetrachloroethane, Trichloroethene, and PVC in Subcritical Water" Environ. Sci. Technol. 2002, 36; pp. 1337-1343.
Poerschmann, J. et al; "Hydrothermal carbonization of poly(vinyl chloride)" Chemosphere 119 (2015); pp. 682-689.
Sheu, Shih-Hsiung et al.; "Treatment of Olefin Plant Spent Caustic by Combination of Neutralization and Fenton Reaction" PII: S0043-1354(00)00466-8, Wat. Res. vol. 35, No. 8, 2001; pp. 2017-2021.
Takeshita, Yukitoshi et al.; "Basic study on treatment of waste polyvinyl chloride plastics by hydrothermal decomposition in subcritical and supercritical regions" J. of Supercritical Fluids 31 (2004); pp. 185-193.
U.S. Appl. No. 17/576,678 (SA51685) titled "Hydrothermal Conversion of Plastic to Oil", filed Jan. 14, 2022.
Wang, Yihan et al.; "Low chlorine oil production through fast pyrolysis of mixed plastics combined with hydrothermal dechlorination pretreatment" Process Safety and Environmental Protection 149 (2021); pp. 105-114.
Yao, Zhongliang et al.; "A new approach to transforming PVC waste into energy via combined hydrothermal carbonization and fast pyrolysis" Energy 141 (2017); pp. 1156-1165.

\* cited by examiner

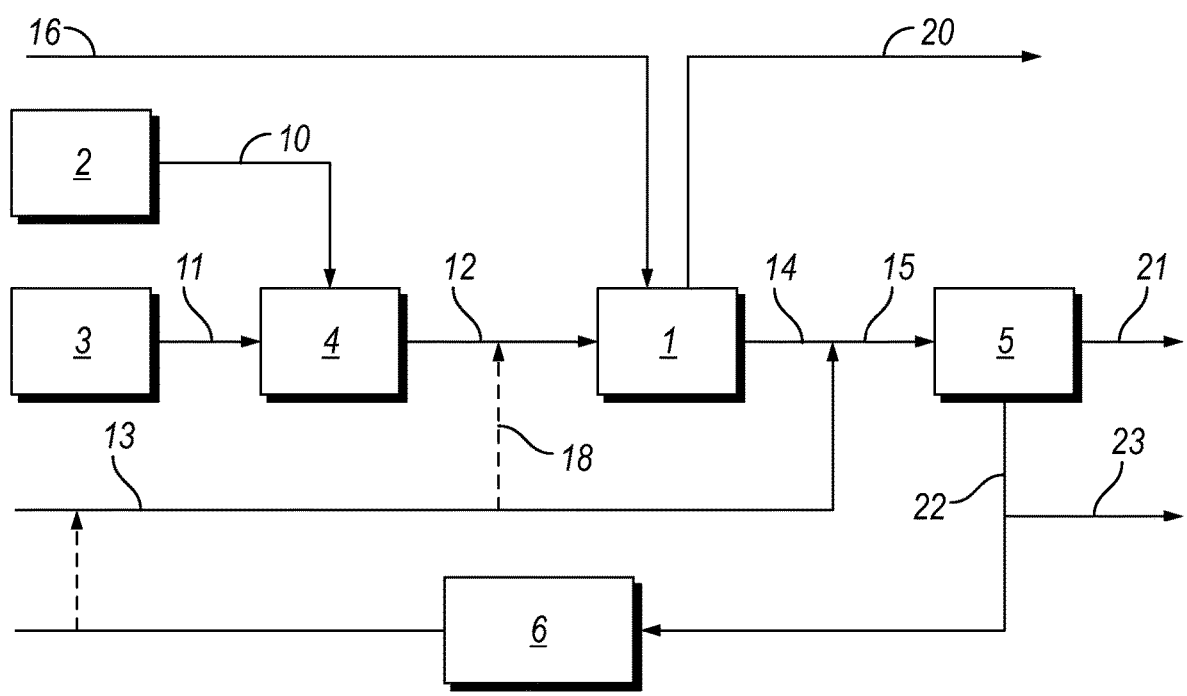

HYDROTHERMAL DEHALOGENATION OF CHEMICALS

TECHNICAL FIELD

Disclosed are methods for treating chemicals. Specifically, disclosed are methods and systems for removing halogens from waste plastics with spent caustic.

BACKGROUND

Polyvinyl chloride (PVC) is one of the most abundant plastics used for consumable goods. It has relatively high abrasion resistance, mechanical strength, hardness, and durability. It is also stable in various chemical environment. By adding plasticizer, it can be highly flexible.

However, recycling used PVC is very difficult due to the presence of chlorine in the structure. Incineration of PVC waste generates highly toxic materials such as dioxin. Pyrolysis is not a suitable recycling method because anaerobic pyrolysis produces hydrogen chloride (HCl) and chloroaromatic compounds which can be harmful to the environment.

Spent caustic solution is an alkaline aqueous solution produced from sweetening processes where hydrogen sulfide ($H_2S$) and mercaptan are removed. The MEROX™ process is one of the common examples of sweetening processes. Spent caustic solution is a byproduct of the sweetening process and needs to be treated before recycling or discharging to the environment.

There are many wastewater treatment methods, such as biological treatment, adsorption, membrane treatment, for destroying organic compounds in water before recycling or discharging to the environment. However, the presence of sulfur compounds in the spent caustic solution as well as high pH are problematic in wastewater treatment processes.

Several methods have been employed to treat the spent caustic solution. Chemical oxidation and wet air oxidation are an effective way to convert organic compounds to carbon dioxide and other small organic compounds, such as formate, acetate, and carboxylate, and sulfur compounds to sulfate. Such oxidation methods need oxidant, for example air, hydrogen peroxide, or other peroxide, and catalysts, $Fe^{2+}$ in Fenton process, resulting in high operating cost. Biological treatment, which is one of the most common wastewater treatment processes in refinery and petrochemical plants, requires pretreatment of the spent caustic solution, that is neutralization and removal of sulfur compounds. Neutralization of the spent caustic solution with acid, followed by steam stripping (to remove $H_2S$ and mercaptans) is an affordable way to pretreat such a wastewater before biological treatment process. By lowering pH of spent caustic solution, sulfides are converted to $H_2S$. Neutralization of spent caustic solution accompanies evolution of $H_2S$ spontaneously, which must be considered for safety. Thus, neutralization of spent caustic solution must be conducted under well controlled atmosphere and desirably with sulfur recovery unit where $H_2S$ is converted to solid sulfur.

SUMMARY

Disclosed are methods for treating chemicals. Specifically, disclosed are methods and systems for removing halogens from waste plastics with spent caustic.

In a first aspect, a process for treating a plastic waste and a spent caustic is provided. The process includes the steps of mixing a feed plastic and a spent caustic stream in a feed mixer to produce a mixed feed, where the feed plastic includes the plastic waste in the form of plastic waste chips, where the plastic waste is selected from polyvinyl chloride (PVC), halogenated plastics, and combinations of the same, where the spent caustic stream includes sodium hydroxide. The process further includes the steps of introducing the mixed feed to a hydrothermal reactor, reacting the mixed feed in the hydrothermal reactor to produce an effluent, where a residence time in the hydrothermal reactor is in the range between 0.2 hours and 5 hours, where a pressure in the hydrothermal reactor is greater than the saturation pressure of water at the temperature in the hydrothermal reactor such that water in the hydrothermal reactor in liquid phase, where a temperature in the hydrothermal reactor is in the range between 150° C. and 350° C., where chlorine is removed from the plastic waste in the presence of the sodium hydroxide, where the chlorine reacts with sodium hydroxide to produce sodium chloride and water, introducing the effluent to a washing and dewatering unit, where the effluent includes liquid phase materials and solid materials, where the solid materials include dechlorinated plastics, and separating the liquid phase materials and solid materials in the washing and dewatering unit to produce a dechlorinated plastic waste and a neutralized wastewater.

In certain aspects, the plastic waste chips are less than 1 mm. In certain aspects, the halogenated plastics are selected from the group consisting of chlorinated polyvinyl chloride (CPVC), polyvinylidene dichloride (PVDC), and combinations of the same. In certain aspects, the plastic waste further includes thermoplastic polymers selected from the group consisting of polyethylene, polystyrene, polypropylene, and combinations of the same. In certain aspects, a flow rate of the feed plastic and the spent caustic are adjusted to achieve a target pH between 5 and 6 in the hydrothermal reactor. In certain aspects, the process further includes the step of processing the neutralized wastewater into a demineralization unit to produce a demineralized water. In certain aspects, the process further includes the step of introducing a demineralized water to hydrothermal reactor, where the demineralized water can adjust a target pH in the hydrothermal reactor. In certain aspects, a chlorine content of the feed plastic is at least 5 wt %. In certain aspects, the spent caustic in the spent caustic stream has a chemical oxygen demand between 1,000 mg/L and 100,000 mg/L, a total organic carbon between 500 mg/L and 10,000 mg/L, sulfide content between 1,000 mg/L and 40,000 mg/L, an alkaline metals content between 1.5 wt % and 8.5 wt %, and a pH between 11.5 and 13.9.

In a second aspect, a system for treating a plastic waste and a spent caustic is provided. The system includes a plastic waste storage bin configured to store the plastic waste in the form of plastic waste chips, where the plastic waste is selected from polyvinyl chloride (PVC), halogenated plastics, and combinations of the same, a spent caustic storage tank configured to store the spent caustic, where the spent caustic includes sodium hydroxide, a feed mixer fluidly connected to the plastic waste storage bin and the spent caustic storage tank, the feed mixer configured to mix a feed plastic and a spent caustic stream to produce a mixed feed, where the feed plastic includes the plastic waste and the spent caustic stream includes the spent caustic, a hydrothermal reactor, the hydrothermal reactor fluidly connected to the feed mixer, the hydrothermal reactor configured to react the mixed feed to produce an effluent, where a residence time in the hydrothermal reactor is in the range between 0.2 hours and 5 hours, where a pressure in the hydrothermal reactor is greater than the saturation pressure of water at the temperature in the hydrothermal reactor such that water in the hydrothermal reactor in liquid phase, where a temperature in the hydrothermal reactor is in the range between 150° C. and 350° C., where chlorine is removed from the plastic waste in the presence of the sodium hydroxide, where the chlorine reacts with sodium hydroxide to produce sodium chloride and water, and a washing and dewatering unit fluidly connected to the hydrothermal reactor, the washing and dewatering unit configured to separate solid materials and liquid phase materials in the effluent to produce a dechlorinated plastic waste and a neutralized wastewater, where the solid materials include dechlorinated plastics.

In certain aspects, the feed mixer is selected from an inline mixer, T-fitting, Y-fitting, and combinations of the same. In certain aspects, the hydrothermal reactor is selected from a batch reactor having an internal mixing device and a CSTR.

BRIEF DESCRIPTION OF THE DRAWINGS

These and other features, aspects, and advantages of the scope will become better understood with regard to the following descriptions, claims, and accompanying drawings. It is to be noted, however, that the drawings illustrate only several embodiments and are therefore not to be considered limiting of the scope as it can admit to other equally effective embodiments.

FIG. 1 provides a process diagram of an embodiment of the system and process for hydrothermal treatment of waste plastic and spent caustic.

In the accompanying Figures, similar components or features, or both, may have a similar reference label.

DETAILED DESCRIPTION

While the scope of the apparatus and method will be described with several embodiments, it is understood that one of ordinary skill in the relevant art will appreciate that many examples, variations and alterations to the apparatus and methods described here are within the scope and spirit of the embodiments.

Accordingly, the embodiments described are set forth without any loss of generality, and without imposing limitations, on the embodiments. Those of skill in the art understand that the scope includes all possible combinations and uses of particular features described in the specification.

The systems and methods described treats a plastic waste stream and a spent caustic simultaneously. More specifically, the systems and methods combine a plastic waste stream and a spent caustic stream in a hydrothermal reaction, where the combination treats both simultaneously while enhancing the treatment of each in a mutually beneficial manner. The systems and methods describe using spent caustic solution for highly effective dechlorination of waste PVC by hydrothermal methods.

Advantageously, the systems and processes described can treat two waste streams simultaneously resulting in product streams that can be recycled or released to the environment. Advantageously, each waste stream provides a material needed for treatment by the other stream. The plastic waste stream provides the neutralization agent, the acid, required to neutralize the spent caustic and the spent caustic provides the alkaline compound that acts as an alkaline catalyst to accelerate the nucleophilic substitution reaction. Advantageously, the systems and methods result in neutralization and dechlorination in a single process. Advantageously, the hydrothermal systems and methods enable plastic recycling and waste minimization. Advantageously, the hydrothermal systems and methods enable dechlorination of plastic waste and neutralization of spent caustic in one reactor. Advantageously, the systems and methods can utilize spent caustic to enhance hydrothermal dechlorination of PVC. Advantageously, the systems and methods can utilize PVC to neutralize spent caustic.

As used throughout, "cracking" refers to the breaking of hydrocarbons into smaller ones containing fewer carbon atoms due to the breaking of carbon-carbon bonds.

Referring to FIG. 1 an embodiment of the process and system for removing halogens from chemicals is provided.

Feed plastic 10 containing plastic waste chips can be withdrawn from plastic waste storage bin 2. Plastic waste storage bin 2 can collect plastic waste chips and store them until needed in the process. The plastic waste chips are produced from plastic waste that has been disposed of or sent for recycle. The plastic waste can be pulverized, ground, chopped, cut, or combination of the same to mechanically produce the plastic waste chips. The plastic waste chips can be less than 5 millimeters (mm), alternately less than 1 mm, alternately between 0.5 mm and 1.5 mm, and alternately between 0.1 mm and 1 mm.

The plastic waste can include plastics of polyvinyl chloride (PVC), halogenated plastics, thermoplastic polymers, and combinations of the same. Halogenated plastics can include chlorinated polyvinyl chloride (CPVC), polyvinylidene dichloride (PVDC), and combinations of the same. Thermoplastic polymers can include polyethylene, polystyrene, polypropylene, and combinations of the same. Advantageously and unexpectedly, the chlorine content of feed plastic 10 must be at least 5 percent by weight (wt %) in order to achieve the desired result. The chlorine content of PVC is between 56 to 57 wt %. Plastic waste storage bin 2 can contain at least 9 wt % PVC to have a chlorine content of 5 wt %. Alternately plastic waste storage bin 2 can contain between 9 wt % and 100 wt % PVC to have a chlorine content of at least 5 percent by weight (wt %).

Spent caustic stream 11 can be withdrawn from spent caustic storage tank 3. Spent caustic stream 11 can contain spent caustic produced from a sweetening process. Spent caustic stream 11 is an aqueous caustic solution. The spent caustic contains sodium hydroxide and water. Any sweetening process capable of removing hydrogen sulfide and mercaptans from an alkaline aqueous solution and producing spent caustic as a byproduct is suitable. In at least one embodiment, the sweetening process is a MEROX unit from an LPG treatment, naphtha treatment, or kerosene treatment.

The spent caustic solution in spent caustic storage tank 3 has a chemical oxygen demand between 1,000 mg/L and 100,000 mg/L, a total organic carbon between 500 mg/L and 10,000 mg/L, sulfide content between 1,000 mg/L and 40,000 mg/L, an alkaline metals content between 1.5 wt % and 8.5 wt %, and a pH between 11.5 and 13.9. The alkaline metals in the spent caustic can be present as dissolved alkaline hydroxides. If the spent caustic solution in spent caustic storage tank 3 has a pH less than 11.5, alkali compounds, such as sodium hydroxide can be added to increase the pH. Maintaining the pH in the range between 11.5 and 13.9 plays a role in accelerating nucleophilic substitution of chloride with hydroxide. Spent caustic storage tank 3 can include instrumentation to measure the parameters and conditions in spent caustic storage tank 3.

Feed plastic 10 and spent caustic stream 11 are mixed in feed mixer 4 to produced mixed feed 12. Feed mixer 4 can be any type of mixing unit capable of mixing two streams. Examples of feed mixer 4 includes inline mixer, T-fitting, Y-fitting, and combinations of the same. introduced to hydrothermal reactor 1. The flow rate of feed plastic 10 and spent caustic stream 11 are adjusted to achieve a target pH of effluent 14 from hydrothermal reactor 1. The target pH of effluent 14 from hydrothermal reactor 1 is less than 6, alternately less than 5, alternately between 0 and 5, and alternately between 0 and 6. One of skill in the art will appreciate that pH of the internal fluid changes dynamically throughout the neutralization reaction. Hydrothermal reactor 1 can contain a pH meter inside to monitor pH of the internal fluid. In at least one embodiment, steady and consistent pH readings can be one of the indicators for determining the end of the neutralization and dechlorination reaction. To control the pH in hydrothermal reactor 1, water feed 18 can be added. Water feed 18 can be a slip stream from demineralized water 13. Demineralized water 13 can be any source for demineralized water. Demineralized water can have a conductivity less than 5 microsiemens (µS)/centimeter (cm), alternately less than 2 µS/cm, alternately less than 1 µS/cm, and alternately between 1 µS/cm and 5 µS/cm. The flow rate of water feed 18 can be based on the target pH.

Hydrothermal reactor 1 can be selected from a batch reactor having an internal mixing device, and a CSTR. The internal mixing device in a batch reactor in hydrothermal reactor 1 can be an agitator. Residence time of the internal fluid in hydrothermal reactor 1 can be determined by the pH of the internal fluid. The greater the pH of spent caustic stream 11 the shorter the residence time and vice versa. Dechlorination is not entirely controlled by reaction kinetics and depends also on the mass transfer of chloride, which is embedded in the bulk plastic. Because dechlorination depends on mass transfer in addition to reaction kinetics monitor pH change is important to residence time. The residence time of the internal fluid in hydrothermal reactor 1 is in the range of 0.2 hours and 5 hours and alternately the range of 0.5 and 2 hours. The pressure of hydrothermal reactor 1 is controlled by purging gas 16 and a pressure controller located in the process line carrying gas product 20. The pressure in hydrothermal reactor 1 is controlled to be greater than the saturation pressure of water at the temperature in hydrothermal reactor 1 such that any water in hydrothermal reactor 1 is in the liquid phase. Maintaining water in the liquid phase is required for alkali assisted dechlorination because steam will result in precipitation of alkali. Additionally, due to the lower dielectric constant of steam compared to liquid water, in the presence of steam alkali compounds will be present as solids and not dissolved. Purging gas 16 can be any inert gas to purge out hydrogen sulfide ($H_2S$), chlorine, methane, ethane, ethylene, and any other gases produced in the neutralization of spent caustic by HCl. The inert gas can include nitrogen, helium, argon, and combinations of the same.

The temperature of the internal fluid in hydrothermal reactor 1 can be in the range between 150° C. and 350° C., alternately in the range between 200° C. and 250° C. The temperature can be controlled by a heater associated with the reactor. Examples of heaters include internal heater, heating jacket, and combinations of the same. The neutralization reaction of sodium hydroxide and hydrogen chloride is an exothermic reaction and can supply a portion of the heat energy to hydrothermal reactor 1.

In hydrothermal reactor 1, chlorine in the PVC or halogenated plastics can be removed as hydrogen chloride (HCl) under the hydrothermal conditions. Chloride is removed through nucleophilic substitution reaction with water to form polyols or through ionic chain reaction to form polyene. The polyols can be converted to polyene through intramolecular dehydration reactions. At temperatures less than 400° C. the nucleophilic substitution reactions are dominant. Advantageously, the spent caustic acts as the alkaline source to enhance dechlorination of the PVC. Advantageously, the presence of sodium hydroxide from the spent caustic acts as a catalyst and accelerates the nucleophilic substitution reaction of PVC and the halogenated plastics. At temperatures greater than 400° C. the ionic chain reactions are dominant. Thus, at the reaction conditions in hydrothermal reactor 1 the nucleophilic substitution reactions are dominant and polyols are more abundant than the polyenes. The polyols and polyenes, along with the thermoplastic polymers, are then converted to other compounds by cracking reactions, condensation reactions, cross-linking reactions, and other reactions that occur in hydrothermal reactors or follow-on treatments, such as anaerobic pyrolysis, where temperatures exceed 450° C. The extent of cracking reactions in hydrothermal reactor 1 is limited due to lower temperatures. Advantageously, once the chlorine is removed from the PVC and halogenated plastics the ability to convert the de-chlorinated materials to other compounds is accelerated. The chlorine released in the nucleophilic substitution reaction of PVC and halogenated plastics forms HCl. The HCl then neutralizes the sodium hydroxide in the spent caustic. Thus, both the plastic waste chips and the spent caustic contribute to treating the other in hydrothermal reactor 1. The reaction between HCl and NaOH produces NaCl and water.

$H_2S$ and other gases are removed from hydrothermal reactor 1 through gas product 20. Gas product 20 can be subjected to sulfur recovery unit or other sulfur capturing unit to remove sulfur compounds from the exhaust gases in gas product 20. Effluent 14 is transferred to washing and dewatering unit 5. Demineralized water 13 is introduced to washing and dewatering unit 5 along with effluent 14. Effluent 14 contains liquid phase materials and solid materials. The liquid phase materials include water and hydrocarbons. The solid materials include dechlorinated plastics.

Washing and dewatering unit 5 can be any type of separation unit capable of separating liquid and solid materials. In washing and dewatering unit 5, the liquid phase materials are separated from the solid materials. The water in demineralized water 13 washes out residual chloride ions, sodium ions, and other water-soluble compounds. In washing and dewatering unit 5, dewatering can occur at temperatures less than 100° C. and atmospheric pressure or pressures less than 100 psig. The dewatering unit can have an internal mixing device, such as an agitator.

Solid materials are removed from washing and dewatering unit 5 as dechlorinated plastic waste 21. Dechlorinated plastic waste 21 can be subjected to further treatment processes including recycling processes. An example recycling process is anaerobic pyrolysis.

Liquid phase materials are removed from washing and dewatering unit 5 as neutralized wastewater 22. Neutralized wastewater 22 can be further treated. In at least one embodiment, neutralized wastewater 22 can be treated in demineralization unit 6 and recycled back to the process as demineralized water 13. Demineralization unit 6 can be selected from reverse osmosis membrane and ion exchange. In an optional embodiment, neutralized wastewater 22 can be discharged through discharge stream 23 to a wastewater treatment unit. In the wastewater treatment unit, discharge stream 23 can be treated and released to the environment or used in other processes.

The process to treat spent caustic are in the absence of $Fe^{2+}$ as a catalyst. The process to treat spent caustic is in the absence of hydrogen peroxide. The process to treat plastic waste and spent caustic is in the absence of biomass.

EXAMPLE

The Example was a comparison of treatment of waste plastic in spent caustic and in water. In experiment 1, the feed plastic was treated in spent caustic. Feed plastic consisted of 45wt % PVC, 24 wt % polyethylene, 19 wt % polypropylene, and 12 wt % polystyrene. The plastic waste chips in feed plastic 10 were chopped to a size between 0.8 mm and 1.5 mm. Spent caustic was produced from an LPG sweetening process having the properties in Table 1.

TABLE 1

Properties of Spent Caustic

| Property | Unit | Value |
| --- | --- | --- |
| Chemical Oxygen Demand | mg/L | 3,500 |
| Total Organic Carbon | mg/L | 1,350 |
| Sulfides | mg/L | 4,300 |
| Alkaline metals | Wt % | 3.8 |

The hydrothermal reactor was an autoclave-type reactor having an internal volume of 1,000 ML with an internal agitator. Spent caustic in an amount of 500 mL and feed plastic in a weight of 71 g was added to the hydrothermal reactor. The hydrothermal reactor was purged with nitrogen to remove air by pressurizing the reactor with nitrogen at 0.3 barg under agitation of 200 rpm and then releasing nitrogen to 0.05 barg under agitation of 200 rpm. This process was repeated three times. Then the hydrothermal reactor was charged with 3 barg of nitrogen. The hydrothermal reactor was heated to 240° C. at the rate of 50° C./10 min and maintained at 240° C. for 0.5 hr.

Following reaction, the hydrothermal reactor was cooled to 60° C. The reaction effluent in the hydrothermal reactor were recovered and filtered to measure the weight of solid product. The weight of solid product was 52.8 grams. The solid product was analyzed to determine the chorine content, which was then used for estimating dechlorination. Dechlorination was about 96%. The pH of neutralized wastewater was measured at about 5.7.

In experiment 2, the feed plastic was treated in demineralized water. The feed plastic, reactor charge, operating conditions, and operating process was the same as in experiment 1. In experiment 2 the dechlorination efficiency was 57%.

The example shows the beneficial impact of dechlorination reactions in hydrothermal reactor in the presence of caustic.

Although the present invention has been described in detail, it should be understood that various changes, substitutions, and alterations can be made hereupon without departing from the principle and scope of the invention. Accordingly, the scope of the present invention should be determined by the following claims and their appropriate legal equivalents.

There various elements described can be used in combination with all other elements described here unless otherwise indicated.

The singular forms "a", "an" and "the" include plural referents, unless the context clearly dictates otherwise.

Optional or optionally means that the subsequently described event or circumstances may or may not occur. The description includes instances where the event or circumstance occurs and instances where it does not occur.

Ranges may be expressed here as from about one particular value to about another particular value and are inclusive unless otherwise indicated. When such a range is expressed, it is to be understood that another embodiment is from the one particular value to the other particular value, along with all combinations within said range.

Throughout this application, where patents or publications are referenced, the disclosures of these references in their entireties are intended to be incorporated by reference into this application, in order to more fully describe the state of the art to which the invention pertains, except when these references contradict the statements made here.

As used here and in the appended claims, the words "comprise," "has," and "include" and all grammatical variations thereof are each intended to have an open, non-limiting meaning that does not exclude additional elements or steps.

That which is claimed is:

1. A process for treating a plastic waste and a spent caustic, the process comprising the steps of:
   mixing a feed plastic and a spent caustic stream in a feed mixer to produce a mixed feed, wherein the feed plastic comprises the plastic waste in the form of plastic waste chips, wherein the plastic waste is selected from polyvinyl chloride (PVC), halogenated plastics, and combinations of the same, wherein the spent caustic stream comprises sodium hydroxide;
   introducing the mixed feed to a hydrothermal reactor;
   reacting the mixed feed in the hydrothermal reactor to produce an effluent, wherein a residence time in the hydrothermal reactor is in the range between 0.2 hours and 5 hours, wherein a pressure in the hydrothermal reactor is greater than the saturation pressure of water at the temperature in the hydrothermal reactor such that water in the hydrothermal reactor in liquid phase, wherein a temperature in the hydrothermal reactor is in the range between 150° C. and 350° C., wherein chlorine is removed from the plastic waste in the presence of the sodium hydroxide, wherein the chlorine reacts with sodium hydroxide to produce sodium chloride and water;
   introducing the effluent to a washing and dewatering unit, wherein the effluent comprises liquid phase materials and solid materials, wherein the solid materials comprise dechlorinated plastics; and
   separating the liquid phase materials and solid materials in the washing and dewatering unit to produce a dechlorinated plastic waste and a neutralized wastewater.

2. The process of claim 1, wherein the plastic waste chips are less than 1 mm.

3. The process of claim 1, wherein the halogenated plastics are selected from the group consisting of chlorinated polyvinyl chloride (CPVC), polyvinylidene dichloride (PVDC), and combinations of the same.

4. The process of claim 1, wherein the plastic waste further comprises thermoplastic polymers selected from the group consisting of polyethylene, polystyrene, polypropylene, and combinations of the same.

5. The process of claim 1, wherein a flow rate of the feed plastic and the spent caustic are adjusted to achieve a target pH between 5 and 6 in the hydrothermal reactor.

6. The process of claim 1, further comprising the step of processing the neutralized wastewater into a demineralization unit to produce a demineralized water.

7. The process of claim 1, further comprising the step of introducing a demineralized water to hydrothermal reactor, wherein the demineralized water can adjust a target pH in the hydrothermal reactor.

8. The process of claim 1, wherein a chlorine content of the feed plastic is at least 5 wt %.

9. The process of claim 1, wherein the spent caustic in the spent caustic stream has a chemical oxygen demand between 1,000 mg/L and 100,000 mg/L, a total organic carbon between 500 mg/L and 10,000 mg/L, sulfide content between 1,000 mg/L and 40,000 mg/L, an alkaline metals content between 1.5 wt % and 8.5 wt %, and a pH between 11.5 and 13.9.

10. A system for treating a plastic waste and a spent caustic, the system comprises:
 a plastic waste storage bin configured to store the plastic waste in the form of plastic waste chips, wherein the plastic waste is selected from polyvinyl chloride (PVC), halogenated plastics, and combinations of the same;
 a spent caustic storage tank configured to store the spent caustic, wherein the spent caustic comprises sodium hydroxide;
 a feed mixer fluidly connected to the plastic waste storage bin and the spent caustic storage tank, the feed mixer configured to mix a feed plastic and a spent caustic stream to produce a mixed feed, wherein the feed plastic comprises the plastic waste and the spent caustic stream comprises the spent caustic;
 a hydrothermal reactor, the hydrothermal reactor fluidly connected to the feed mixer, the hydrothermal reactor configured to react the mixed feed to produce an effluent, wherein a residence time in the hydrothermal reactor is in the range between 0.2 hours and 5 hours, wherein a pressure in the hydrothermal reactor is greater than the saturation pressure of water at the temperature in the hydrothermal reactor such that water in the hydrothermal reactor in liquid phase, wherein a temperature in the hydrothermal reactor is in the range between 150° C. and 350° C., wherein chlorine is removed from the plastic waste in the presence of the sodium hydroxide, wherein the chlorine reacts with sodium hydroxide to produce sodium chloride and water; and
 a washing and dewatering unit fluidly connected to the hydrothermal reactor, the washing and dewatering unit configured to separate solid materials and liquid phase materials in the effluent to produce a dechlorinated plastic waste and a neutralized wastewater, wherein the solid materials comprise dechlorinated plastics.

11. The system of claim 10, wherein the plastic waste chips are less than 1 mm.

12. The system of claim 10, wherein the halogenated plastics are selected from the group consisting of chlorinated polyvinyl chloride (CPVC), polyvinylidene dichloride (PVDC), and combinations of the same.

13. The system of claim 10, wherein the plastic waste further comprises thermoplastic polymers selected from the group consisting of polyethylene, polystyrene, polypropylene, and combinations of the same.

14. The system of claim 10, wherein a flow rate of the feed plastic and the spent caustic are adjusted to achieve a target pH between 5 and 6 in the hydrothermal reactor.

15. The system of claim 10, further comprising a demineralization unit fluidly connected to the washing and dewatering unit, the demineralization unit configured to treat the neutralized wastewater to produce a demineralized water.

16. The system of claim 10, wherein a chlorine content of the feed plastic is at least 5 wt %.

17. The system of claim 10, wherein the spent caustic in the spent caustic stream has a chemical oxygen demand between 1,000 mg/L and 100,000 mg/L, a total organic carbon between 500 mg/L and 10,000 mg/L, sulfide content between 1,000 mg/L and 40,000 mg/L, an alkaline metals content between 1.5 wt % and 8.5 wt %, and a pH between 11.5 and 13.9.

18. The system of claim 10, wherein the feed mixer is selected from an inline mixer, T-fitting, Y-fitting, and combinations of the same.

19. The system of claim 10, wherein the hydrothermal reactor is selected from a batch reactor having an internal mixing device and a CSTR.

\* \* \* \* \*